US 6,590,675 B1

(12) United States Patent
Tomiyasu

(10) Patent No.: US 6,590,675 B1
(45) Date of Patent: Jul. 8, 2003

(54) METHOD AND SYSTEM FOR IMAGE PRINTING CAPABLE OF PROPERLY PERFORMING A FORM OVERLAY

(75) Inventor: Kunio Tomiyasu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/507,005

(22) Filed: Feb. 22, 2000

(30) Foreign Application Priority Data

Mar. 10, 1999 (JP) .......................................... 11-063376

(51) Int. Cl.[7] .............................................. G06K 15/00
(52) U.S. Cl. ....................................... 358/1.18; 358/540
(58) Field of Search ................................. 358/1.1, 1.18, 358/540, 538, 462, 450, 1.6, 530, 537; 707/500, 515, 516, 517, 521, 524, 522, 539; 382/284, 282, 283

(56) References Cited

U.S. PATENT DOCUMENTS 4,692,757 A * 9/1987 Tsuhara et al. ............. 345/636
5,995,719 A * 11/1999 Bourdead'hui et al. .... 358/1.12

* cited by examiner

Primary Examiner—Arthur G. Evans
(74) Attorney, Agent, or Firm—Cooper & Dunham LLP

(57) ABSTRACT

A printing method for a print system operating with an operating system, which includes the steps of providing, storing, selecting, and executing. The providing steps provide an application for generating print data and a print station. The storing step stored form data. The selecting step selects at least one of a first form overlay instruction for assigning the print data as a background image and the form data as a foreground and a second form overlay instruction for assigning the print data as a foreground image and the form data as a background. The executing executes a first form overlay operation, and includes the steps of adding and transmitting. The adding step adds the form data immediately after each page of the print data when the selecting step selects the first form overlay instruction and the form data in front of each page of the print data when the selecting step selects the second form overlay instruction. The transmitting step transmits the print data added with the form data to the print station.

26 Claims, 7 Drawing Sheets

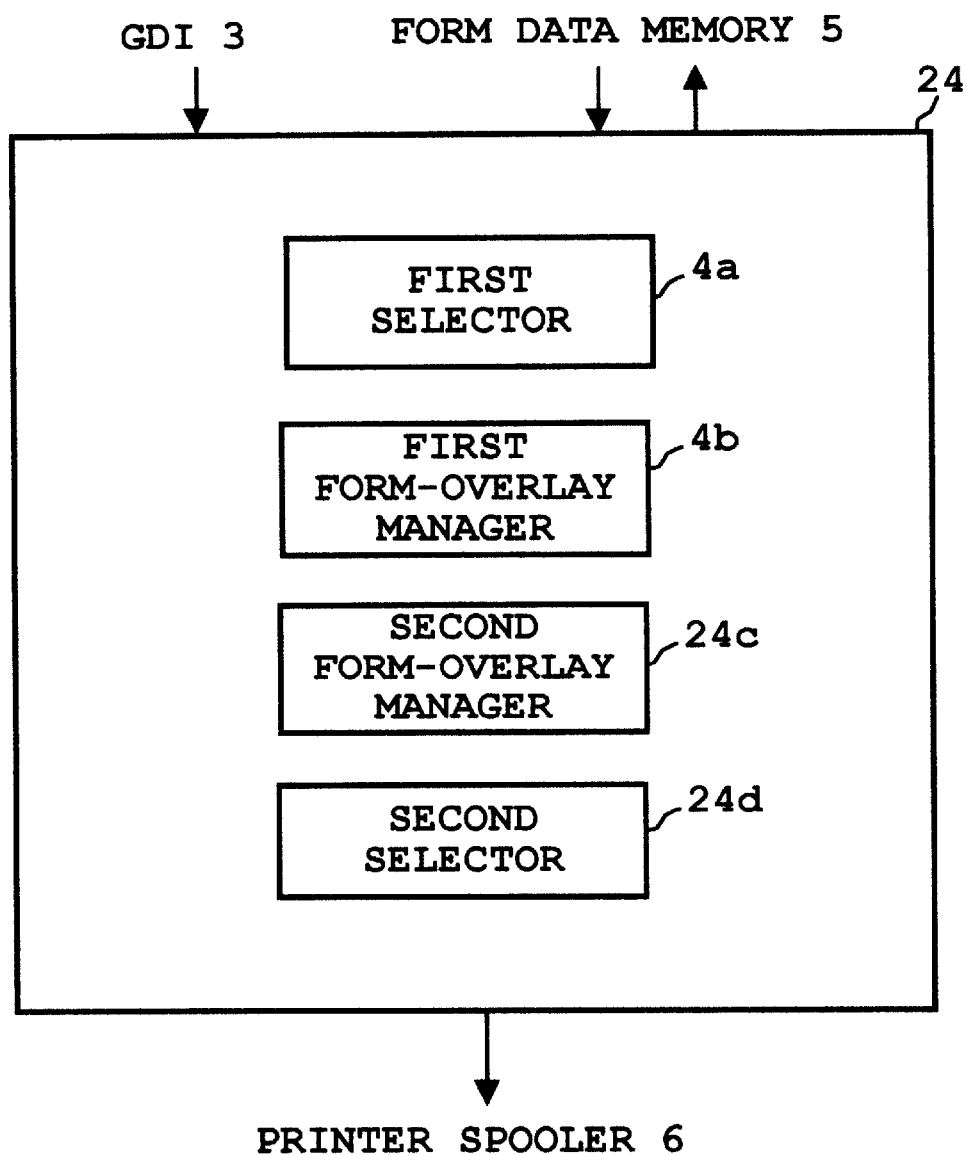

METHOD AND SYSTEM FOR IMAGE PRINTING CAPABLE OF PROPERLY PERFORMING A FORM OVERLAY

BACKGROUND OF THE INVENTION

1. Field of the Invention

The present invention relates to a method and system for image printing, and more particularly to a method and system for image printing that is capable of properly performing a form overlay.

2. Discussion of the Background

In general, a printing system including a host apparatus and a print station has been capable of performing a form overlay with which a document is overlaid on a format or vise versa. For example, this function is used when a logo mark is separately prepared and is needed to be combined with a document. Then, the logo mark is handled as a fixed format to be printed every page. In this case, the positions of the logo mark and the document in the page are different with each other and do not affect each other.

A so-called stamp print and a water marking, both for printing a fixed mark on a document, have also been developed as convenient form overlay functions. These functions can be implemented in a printer driver. The PCL driver manufactured by Hewlett-Packard Co. is one example of such a printer driver.

In using the form overlay function, it is needed to determine whether a document is to be a background or a format is to be a background. Generally, this determination is performed by an application program (hereinafter referred to as an application) or a printer driver. Some printer drivers can use formats created with any application but others cannot.

Some applications, such as Microsoft PowerPoint sold by Microsoft Corporation, are capable of generating a page document and, when these applications perform a form overlay, they paint with a white color a region where the document is expanded before the document is placed on the region. Thus, in a combination use of an application with other applications so as to mix a document and background formats, it is possible that the background format is not shown on the page because the page having the background format is painted with a white color before an image of the document is overlaid on the background format.

SUMMARY OF THE INVENTION

The present invention provides a novel printing method for a print system operating with an operating system. In one embodiment, a novel printing system includes the steps of providing, storing, selecting, and executing. The providing steps provide an application for generating print data and a print station. The storing step stored form data. The selecting step selects at least one of a first form overlay instruction for assigning the print data as a background image and the form data as a foreground and a second form overlay instruction for assigning the print data as a foreground image and the form data as a background. The executing executes a first form overlay operation, and includes the steps of adding and transmitting. The adding step adds the form data immediately after each page of the print data when the selecting step selects the first form overlay instruction and the form data in front of each page of the print data when the selecting step selects the second form overlay instruction. The transmitting step transmits the print data added with the form data to the print station.

The above-mentioned method may further include a step of executing a second form overlay operation which includes the steps of sending, storing, generating, adding, and transferring. The sending step sends a form registration instruction and the form data to the print station. The storing step stores the form data in the print station. The generating step generates a form overlay execution command. The adding step adds the form overlay execution command immediately after each page of the print data when the selecting step selects the first form overlay instruction and the form overlay execution command in front of each page of the print data when the selecting step selects the second form overlay instruction. The transferring step transfers the print data added with the form overlay execution command to the print station. In this case, the method further includes a step of choosing at least one of the first and second executing steps.

The storing step may store the print data generated by the application as form data. In this case, the method further includes a step of neglecting a white painting instruction generated by the application. The white painting instruction instructs to paint a background page with a white color before print data is expanded over the background page.

Further, the present invention provides a novel print system which operates with an operating system and an application, compatible with the operating system, for generating print data. In one embodiment, a novel print system includes a print station, a memory for storing form data, and a printer driver which is configured to control a storage of the form data to the memory and to control data transmission of the print data and the form data to the print station. The printer driver includes a first selector and a first form-overlay manager. The first selector selects at least one of a first form overlay instruction for assigning the print data as a background image and the form data as a foreground and a second form overlay instruction for assigning the print data as a foreground image and the form data as a background. The first form-overlay manager executes a first form-overlay operation for adding the form data immediately after each page of the print data when the first selector selects the first form overlay instruction and the form data in front of each page of the print data when the first selector selects the second form overlay instruction, and transmitting the print data added with the form data to the print station.

Further, the present invention provides a novel printer driver of a print system which operates with an operating system and with an application, compatible with the operating system, for generating print data, and which includes a memory for storing form data and a print station for printing the print data. In this case, the printer driver controls a storage of the form data to the memory and data transmission of the print data and the form data to the print station. The printer driver includes a first selector and a first form-overlay manager. The first selector selects at least one of a first form overlay instruction for assigning the print data as a background image and the form data as a foreground and a second form overlay instruction for assigning the print data as a foreground image and the form data as a background. The first form-overlay manager executes a first form-overlay operation for adding the form data immediately after each page of the print data when the first selector selects the first form overlay instruction and the form data in front of each page of the print data when the first selector selects the second form overlay instruction, and transmitting the print data added with the form data to the print station.

Further, the present invention provides a novel method for printer driving in a print system which operates with an operating system and with an application, compatible with the operating system, for generating print data, and which includes a memory for storing form data and a print station for printing the print data. The method include a first selecting step, a first form-overlay executing step, and a transmitting step. The first selecting step selects at least one of a first form overlay instruction for assigning the print data as a background image and the form data as a foreground and a second form overlay instruction for assigning the print data as a foreground image and the form data as a background. The first form-overlay executing step executes a first form-overlay operation for adding the form data immediately after each page of the print data when the first selecting step selects the first form overlay instruction and the form data in front of each page of the print data when the first selecting step selects the second form overlay instruction. The transmitting step transmits the print data added with the form data to the print station.

The present invention further provides a novel computer readable medium which stores computer instructions for performing the steps mentioned above.

This document claims priority rights of and is based on the subject matter described in Japanese Patent Application No. JPAP11-063376 filed on Mar. 10, 1999, the entire contents of which are herein incorporated by reference.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is an illustration for explaining a modified printer driver according an embodiment of the present disclosure;

DESCRIPTION OF THE PREFERRED EMBODIMENTS

Figure 1:
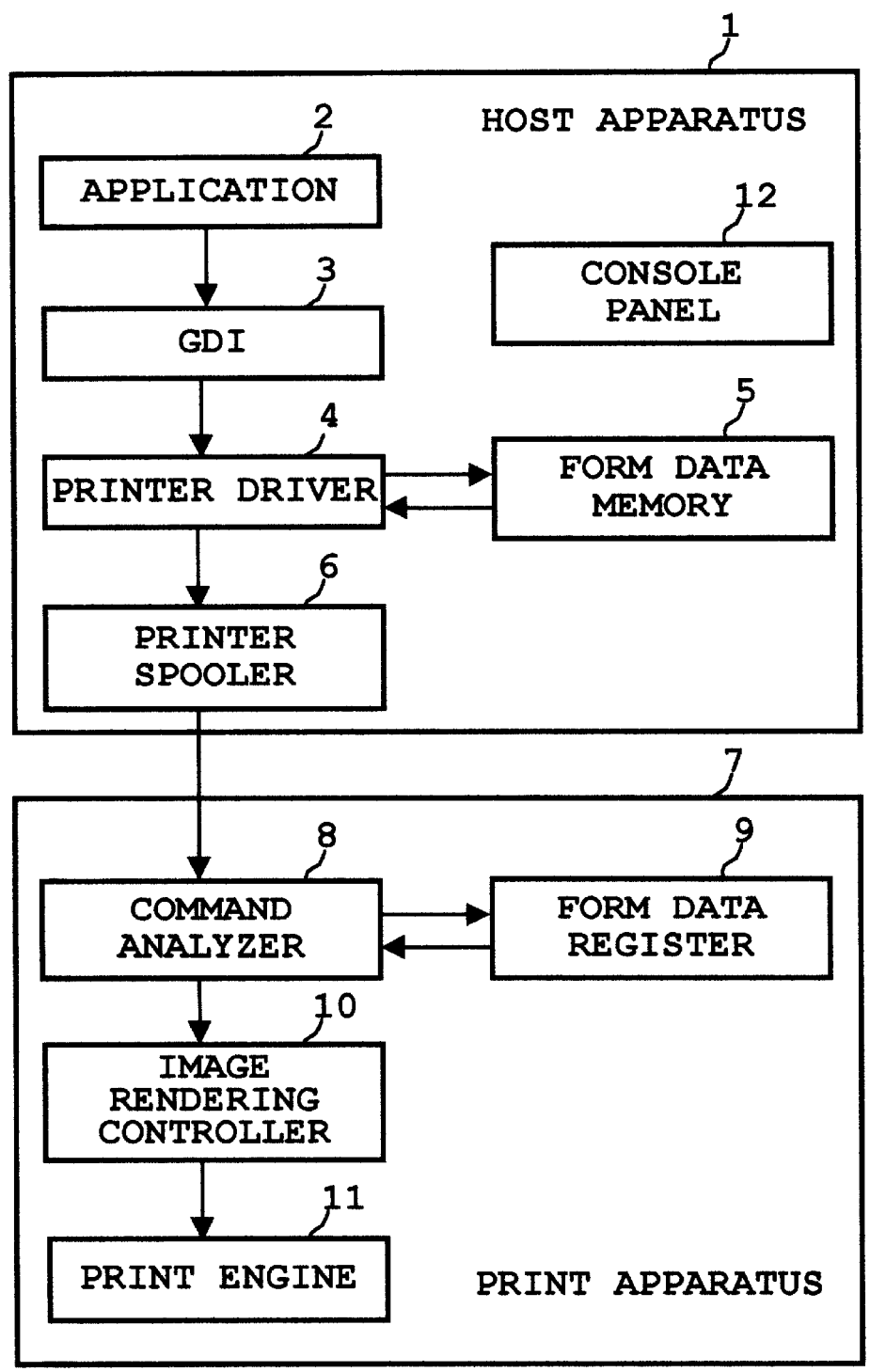
FIG. 1 is a schematic block diagram of a print system according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is shown a schematic block diagram of a print system according to an exemplary embodiment of the present invention. The print system of FIG. 1 includes a host apparatus 1 and a print apparatus 7. The host apparatus 1 includes an application portion 2, a GDI (graphic device interface 3, a printer driver 4, a form data memory 5, and a printer spooler 6. The print apparatus 7 includes a command analyzer 8, a form data register 9, an image rendering controller 10, and a print engine 11. The host apparatus 1 operates with an operating system. The application portion 2 includes a program. The GDI 3 and the printer spooler 6 of the host apparatus 1 may be parts of the operating system of the host apparatus 1. The printer driver 4 may include a program. In addition, the host apparatus 1 includes a console panel 12 which includes a variety of keys (not shown) and a display (not shown), and with which an operator can enter various instructions to the print system.

The GDI 3 performs an operation of processing image data relating to a display and a print, and provides the application 2 with an interface for this operation. The printer driver 4 receives rendering instructions for a print sent from the GDI 3. The printer driver 4 then converts the data into a printer language in accordance with the rendering instructions and transferred the print data to the printer spooler 6. Upon receiving the print data from the printer driver 4, the printer spooler 6 sends the print data to the print apparatus 7. At this time, the printer spooler 6 controls the transmission of print data to the print apparatus 7 depending upon a data rate and the total amount of the print data to be sent in the job.

In the print apparatus 7, upon receiving the print data, the command analyzer 8 analyzes the print data and transfers the print data to the image rendering controller 10 which then renders an image at locations or coordinates in accordance with the received print data. At this time, the image rendering is performed in units of page. The image rendering controller 10 then sends a frame image in units of page, as a video signal, to the print engine 11 upon receiving a page output command.

The above-described procedure is an example of a general print operation in which an image does not include overlaid forms.

Figure 2:
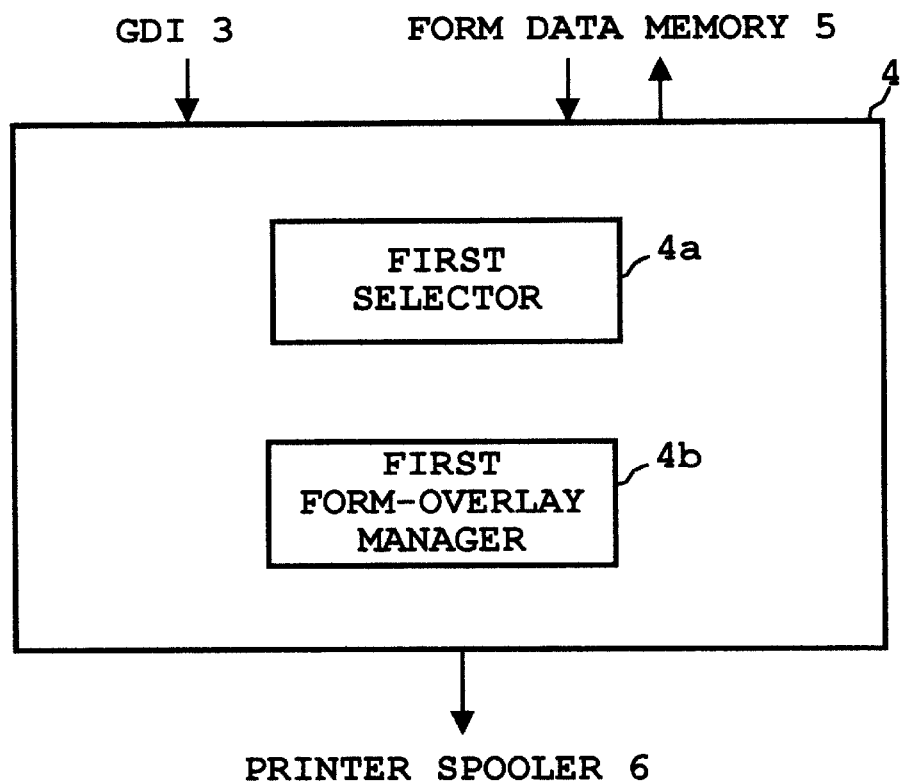
FIG. 2 is an illustration for explaining a printer driver according to an embodiment of the present disclosure.
Figure 3A:
FIGS. 3A and 3B are illustrations for explaining orders of print data and form data handled in the print system of FIG. 1.
Figure 3B:
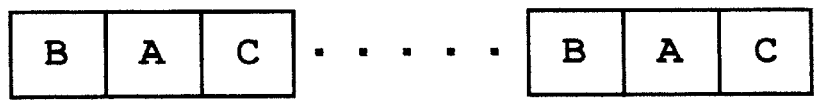

Referring to FIGS. 2, 3A and 3B, an image overlay is explained. The printer driver 4 includes a first selector 4a and a first form-overlay manager 4b. The first selector 4a selects at least one of a setting in which the print data is assigned as a foreground and the form data is assigned as a background and another setting in which the print data is assigned as a background and the form data is assigned as a foreground. The first form-overlay manager 4b adds the form data to the print data and sends to the print apparatus 7.

The image overlay performed by the printer driver 4 is to add an image of the print data to an image of the form data. In the printer driver 4, the first form-overlay manager 4b adds the form data stored in the form data memory 5 to each page of the print data generated by the application portion 2, and sends the thus-added data to the print apparatus 7 via the printer spooler 6. At this time, the first selector 4a selects the setting in which the print data is assigned to one of foreground and background of a print image and the form data is assigned to the other one of foreground and background of a print image, depending upon an order of transmission to the print apparatus 7. At the end of the transmission, the first form-overlay manager 4b sends a new page command, which is regarded as a command for changing a page and also as a command for starting a print, to the print apparatus 7. With this operation, the print apparatus 7 can handle the print data without the needs for distinguishing which is the print data and the form data. As a result, the print engine 11 outputs an image corresponding to the print data, in a way such that the document data created by the application portion 2 and the form data are overlaid in each print page.

To overlay the form data as a background, the host apparatus 1 needs to send the form data, each page of the print data, and a new page command, in this order, to the print apparatus 7, as shown in FIG. 3A. As a result of this procedure, the print data is expanded over an image of the form data. On the contrary, to overlay the from data as a foreground, the order of the data transmission to the print apparatus 7 needs to be each page of the print data, the form data, and a new page command, as shown in FIG. 3B. As a result of this procedure, the form data is expanded over an image of the print data.

In addition, an operator can enter an instruction for selecting the setting with respect to the foreground and background to the first selector 4a of the printer driver 4 through the console panel 12.

Referring to FIGS. 4, 5A–5C, another operation of an image overlay is explained. A modified printer driver 24 is shown in FIG. 4. The modified print driver 24 of FIG. 4 is similar to the printer driver 4 of FIG. 2, except for a second form-overlay manager 24c and a second selector 24d.

Figure 5A:
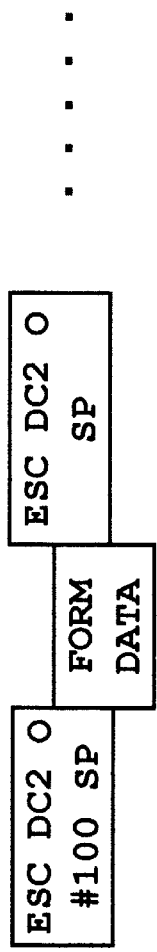
FIGS. 5A–5C are illustrations for explaining a form registration with reference to the orders of print data and form data.

The form data this time is registered in the print apparatus 7. When the modified printer driver 24 receives a print start instruction from the application portion 2, the second form-overlay manager 24c of the modified printer driver 24 converts the form data stored in the form data memory 5, in a similar manner to handle the print data. Through this conversion, the form data is converted into a form-registration command. In this case, the form-registration command includes a header having a form command (i.e., ESC DC2 O), an arbitrary number (i.e., #100) for identifying the form, and a space, form data, an end of form data having the form command (i.e., ESC DC2 O) and a space, and print data, as shown in FIG. 5A. The form-registration command is then sent to the print apparatus 7, in which the form data conveyed with the form-registration command is accordingly registered in the form data register 9.

Figure 5B:
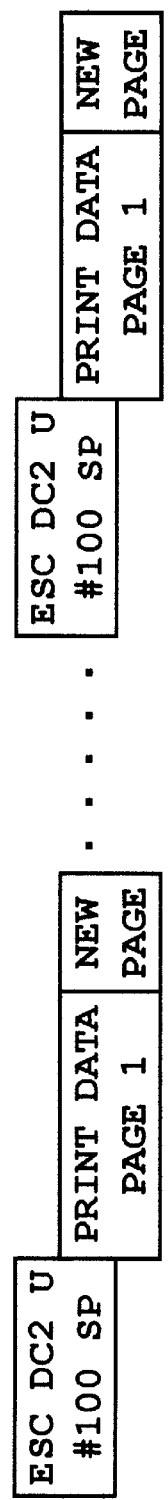
Figure 5C:
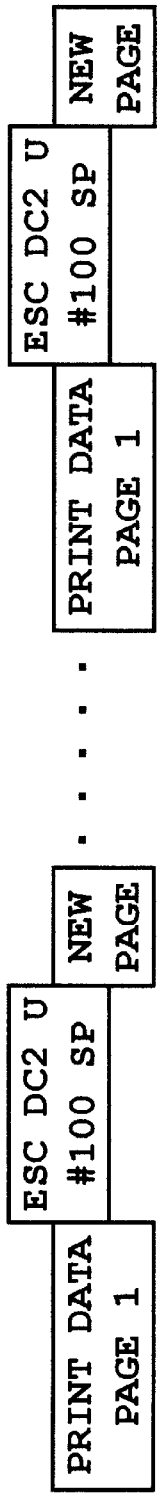

To use the form data registered in the form data register 9, the second form-overlay manager 24c generates a form execution command and sends it to the print apparatus 7. The form execution command includes a form command (i.e., ESC DC2 U), an arbitrary number (i.e., #100) for identifying the form, and a space, for example, as shown in FIG. 5B, In this case, the data strings transmitted to the print apparatus 7 includes the form execution command in front of each page of the print data and a new page command after each page of the print data, as shown in FIG. 5B. An order of this data string corresponds to that of FIG. 3A and, accordingly, the print data is expanded over an image of the form data. FIG. 5C shows another order of the data string, in which the form execution command follows each page of the print data and a new page command after the form execution command. This data string corresponds to that of FIG. 3A and, accordingly, the form data is expanded over an image of the print data.

In the print apparatus 7, the command analyzer 8 analyzes the form-registration command of FIG. 5A sent from the second form-overlay manager 24c included in the modified printer driver 24 of the host apparatus 1 and sends the received form data to the form data register 9 to register it associated with an arbitrary number. In a case where the form data is overlaid as a background, each time when detecting a form execution command in the data string, the command analyzer 8 reads the corresponding form data from the form data register 9 and inserts the form data in the print data string. Thus, the image rendering controller 10 renders a page image of the form data and, after that, an image of the print data over the page image of the form data. In a case where the form data is overlaid as a foreground, the order of handling the form data and the print data is switched in the above-described operation.

In addition, an operator can enter an instruction to the first selector 4a and the second selector 24d of the printer driver 24 through the console panel 12.

Figure 6A:
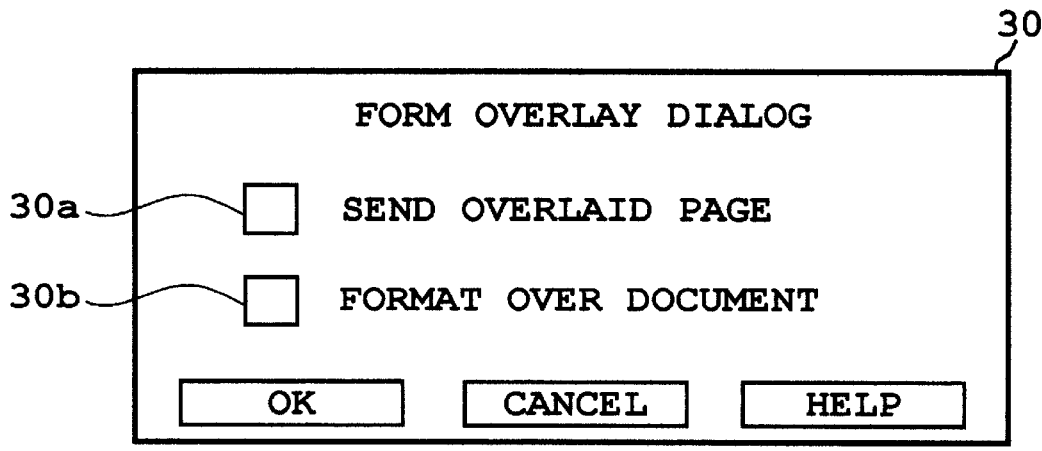
FIGS. 6A and 6B are illustrations for explaining a dialog for a user selection of ways of a form overlay.
Figure 6B:
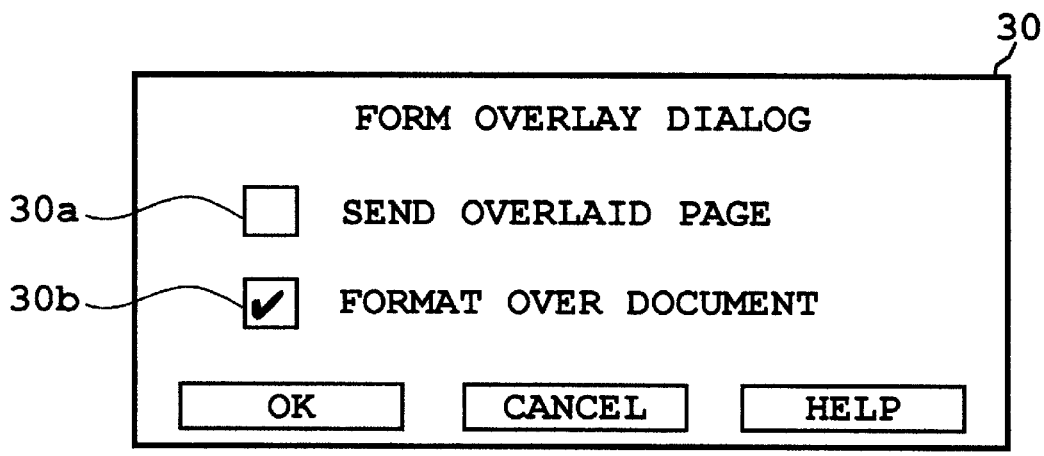

Referring to FIGS. 6A and 6B, an operation for setting conditions of the form overlay is explained. FIG. 4A shows an exemplary dialog 30 on a display (not shown) of the host apparatus 1. The exemplary dialog 30 includes check boxes 30a and 30b. The check box 30a specifies a user instruction such that the form data is assigned as a background. The check box 30b specifies a user instruction such that the data with the form overlay executed in each page is to be sent to the print apparatus. With this dialog 30, an operator can set the conditions of a form overlay as to whether the print data is rendered over the for data or vise versa. For example, if the operator accepts the dialog without a check mark in the check box 30a, as shown in FIG. 6A, the form data is assigned as a background but if the operator accepts the dialog with a check mark in the check box 30a, as shown in FIG. 6B, the form data is assigned as a foreground.

As described above, the check box 30b determines whether the form overlay needs to be executed before the data is sent to the print apparatus 7. That is, if the operator gives a check mark to the check box 30b, the form overlay will be executed in the way as explained with reference to FIGS. 3A and 3B and if the operator gives no check mark to the check box 30b, the form overlay will be executed in the way as explained with reference to FIGS. 5A–5C.

Figure 7A:
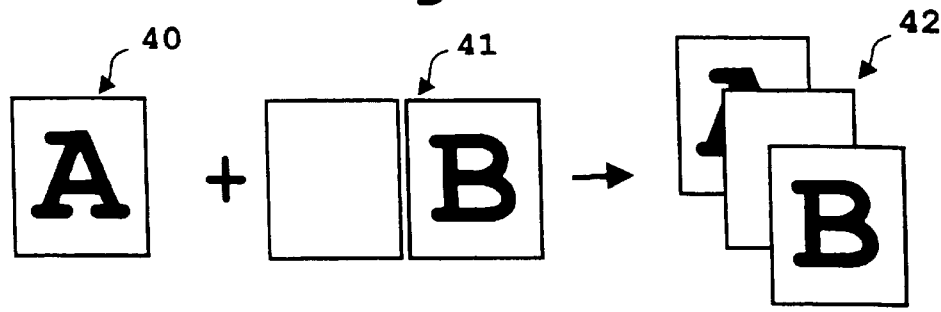
FIGS. 7A, 7B, 8A and 8B are illustrations for explaining exemplary procedures to execute the form overlay in the print system of FIG. 1.
Figure 7B:
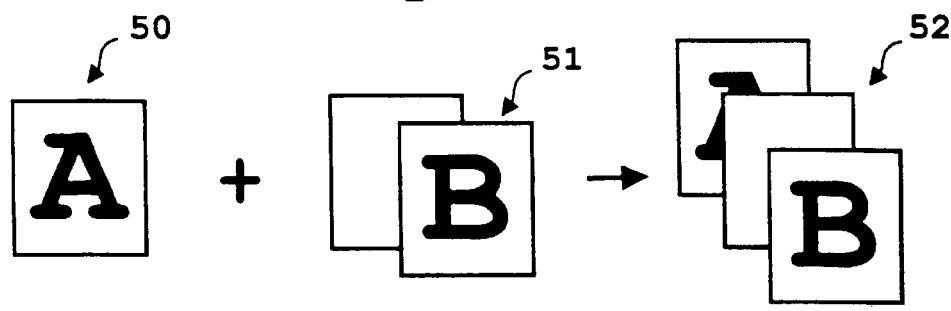

Referring to FIGS. 7A and 7B, exemplary executions of the form overlay are explained. FIG. 7A shows a case in which document data 41 is rendered over a background image with form data 40. In this case, the document data 41 is generated with an application that generates an instruction for painting a whole page with a white color before the corresponding document data 41 is rendered. As a result, in a rendered image 42, the background form image is pained white and cannot be printed. FIG. 7B shows another case in which the form data 51 is rendered over a background image with the document data 50. In this case, the document data 50 is generated with an application and the form data 51 is generated with another application that generates an instruction for painting a whole page with a white color before the corresponding document data 51 is rendered. As a result, the background document image is pained white and cannot be printed in a rendered image 52.

Figure 8A:
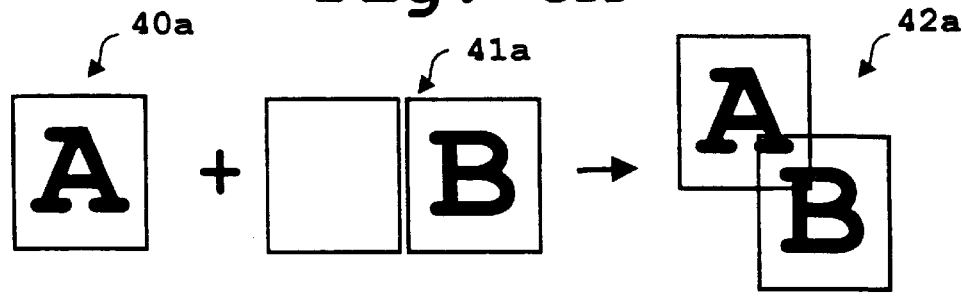
Figure 8B:
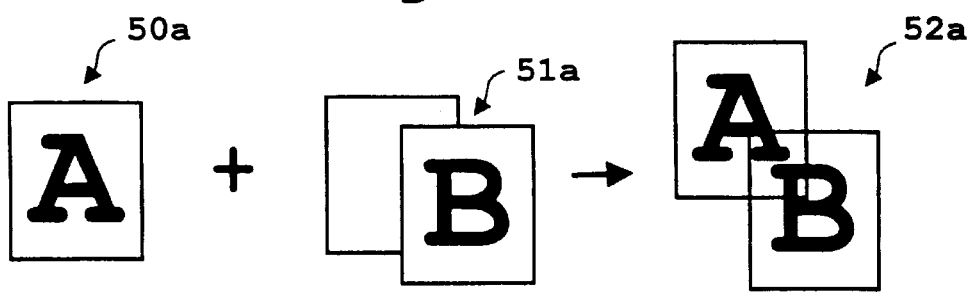

To avoid these operations shown in FIGS. 7A and 7B, the modified printer driver 24 simply disregards the instruction from the application to paint the whole page with a white color. As a result, the background form image is properly printed under the document image, as shown in FIG. 8A. Also, the background document image is properly printed under the form image, as shown in FIG. 8B. Form data 40a, print data 41a, and a rendered image 42a shown in FIG. 8A correspond to those of FIG. 7A, respectively, and form data 50a, print data 51a, and a rendered image 52a shown in FIG. 8B correspond to those of FIG. 7B.

Figure 9:
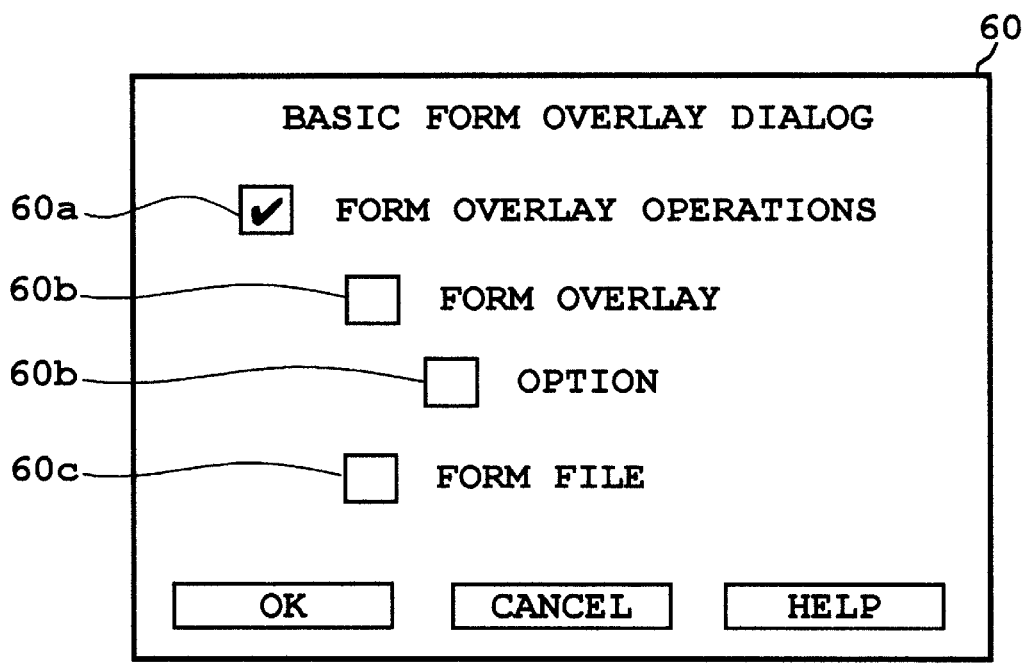
FIG. 9 is an illustration for explaining an exemplary dialog for a basic user selection of the form overlay.

FIG. 9 shows an exemplary dialog 60 of the form overlay for an operator to choose. In this case, the exemplary dialog 60 includes check boxes 60a–60c. The check box 60a selects the form overlay. The check boxes 60b and 60c are checked under the selection of the check box 60a. The check box 60b executes the form overlay and makes an option button 60d effective. This option button will open the form overlay dialog of FIG. 6A so that the operator can select the process of the form overlay. The check box 60c creates a form file, under an arbitrary file name, using the document data which is then generated by the application portion 2.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

I claim:

1. A printing method for a print system which operates with an operating system, comprising the steps of:

providing an application for generating print data;

providing a print station;

storing form data;

selecting at least one of a first form overlay instruction for assigning said print data as a background image and said form data as a foreground and a second form overlay instruction for assigning said print data as a foreground image and said form data as a background; and executing a first form overlay operation which includes the steps of:

adding said form data immediately after each page of said print data when said selecting step selects said first form overlay instruction and said form data in front of each page of said print data when said selecting step selects said second form overlay instruction; and transmitting said print data added with said form data to said print station.

2. The method as defined in claim 1, further comprising a step of executing a second form overlay operation which includes the steps of:

sending a form registration instruction and said form data to said print station;

storing said form data in said print station;

generating a form overlay execution command;

adding said form overlay execution command immediately after each page of said print data when said selecting step selects said first form overlay instruction and said form overlay execution command in front of each page of said print data when said selecting step selects said second form overlay instruction; and transferring said print data added with said form overlay execution command to said print station, and wherein said method further comprising a step of choosing at least one of said first and second executing steps.

3. The method as defined in claim 1, wherein said storing step stores said print data generated by said application as form data, and further comprising a step of neglecting a white painting instruction generated by said application, said white painting instruction instructing to paint a background page with a white color before print data is expanded over said background page.

4. A computer readable medium storing computer instructions for performing the steps recited in anyone of claims 1–3.

5. A print system which operates with an operating system and an application, compatible with said operating system, for generating print data, comprising:

a print station;

a memory for storing form data; and a printer driver which is configured to control a storage of said form data to said memory and to control data transmission of said print data and said form data to said print station, said printer driver comprising:

a first selector which is configured to select at least one of a first form overlay instruction for assigning said print data as a background image and said form data as a foreground and a second form overlay instruction for assigning said print data as a foreground image and said form data as a background; and a first form-overlay manager for executing a first form-overlay operation for adding said form data immediately after each page of said print data when said first selector selects said first form overlay instruction and said form data in front of each page of said print data when said first selector selects said second form overlay instruction, and transmitting said print data added with said form data to said print station.

6. The print system as defined in claim 5, wherein said print station includes a form data register for registering form data sent from said printer driver, and said printer driver further comprising:

a second form-overlay manager which is configured to perform a second form-overlay operation for sending said form data to said print station to store said form data in said form data register of said print station, generating a form overlay execution command, adding said form overlay execution command immediately after each page of said print data when said first selector selects said first form overlay instruction and said form overlay execution command in front of each page of said print data when said first selector selects said second form overlay instruction, and transferring said print data added with said form overlay execution command to said print station; and a second selector for selecting at least one of said first and second form-overlay operations.

7. The print system as defined in claim 5, wherein said printer driver controls said memory to store said print data generated by said application as form data, and said second form-overlay manager of said printer driver neglects a white painting instruction generated by said application, said white painting instruction instructing to paint a background page with a white color before print data is expanded over said background page.

8. The print system as defined in claim 6, further comprising a data entry mechanism for entering user instructions to said first and second selectors.

9. A print system which operates with an operating system, comprising:
 an application, compatible with said operating system, for generating print data;
 printing means;
 storing means for storing form data; and
 printer driving means for controlling a storage of said form data to said memory and controlling data transmission of said print data and said form data to said printing means, said printer driving means comprising:
 first selecting means for selecting at least one of a first form overlay instruction for assigning said print data as a background image and said form data as a foreground and a second form overlay instruction for assigning said print data as a foreground image and said form data as a background; and
 first form-overlay managing means for executing a first form-overlay operation for adding said form data immediately after each page of said print data when said first selecting means selects said first form overlay instruction and said form data in front of each page of said print data when said first selecting means selects said second form overlay instruction, and transmitting said print data added with said form data to said printing means.

10. The print system as defined in claim 9, wherein said printing means includes form data registering means for registering form data sent from said printer driving means, and said printer driving means further comprising:
 second form-overlay managing means for performing a second form-overlay operation for sending said form data to said printing means to store said form data in said form data registering means of said printing means, generating a form overlay execution command, adding said form overlay execution command immediately after each page of said print data when said first selecting means selects said first form overlay instruction and said form overlay execution command in front of each page of said print data when said first selecting means selects said second form overlay instruction, and transferring said print data added with said form overlay execution command to said printing means; and
 second selecting means for selecting at least one of said first and second form-overlay operations.

11. The print system as defined in claim 9, wherein said printer driving means controls said storing means to store said print data generated by said application as form data, and said second form-overlay managing means of said printer driving means neglects a white painting instruction generated by said application, said white painting instruction instructing to paint a background page with a white color before print data is expanded over said background page.

12. The print system as defined in claim 10, further comprising data entry means for entering user instructions to said first and second selecting means.

13. A printer driver of a print system which operates with an operating system and with an application, compatible with said operating system, for generating print data, and which includes a memory for storing form data and a print station for printing said print data, said printer driver being configured to control a storage of said form data to said memory and to control data transmission of said print data and said form data to said print station, said printer driver comprising:
 a first selector which is configured to select at least one of a first form overlay instruction for assigning said print data as a background image and said form data as a foreground and a second form overlay instruction for assigning said print data as a foreground image and said form data as a background; and
 a first form-overlay manager for executing a first form-overlay operation for adding said form data immediately after each page of said print data when said first selector selects said first form overlay instruction and said form data in front of each page of said print data when said first selector selects said second form overlay instruction, and transmitting said print data added with said form data to said print station.

14. The printer driver as defined in claim 13, wherein said print station includes a form data register for registering form data sent from said printer driver, and said printer driver further comprising:
 a second form-overlay manager which is configured to perform a second form-overlay operation for sending said form data to said print station to store said form data in said form data register of said print station, generating a form overlay execution command, adding said form overlay execution command immediately after each page of said print data when said first selector selects said first form overlay instruction and said form overlay execution command in front of each page of said print data when said first selector selects said second form overlay instruction, and transferring said print data added with said form overlay execution command to said print station; and
 a second selector for selecting at least one of said first and second form-overlay operations.

15. The printer driver as defined in claim 13, wherein said printer driver controls said memory to store said print data generated by said application as form data, and said second form-overlay manager of said printer driver neglects a white painting instruction generated by said application, said white painting instruction instructing to paint a background page with a white color before print data is expanded over said background page.

16. The printer driver as defined in claim 14, wherein said print system further comprising a data entry mechanism for entering user instructions to said first and second selectors of said printer driver.

17. A printer driver of a print system which operates with an operating system and with an application, compatible with said operating system, for generating print data, and which includes memory means for storing form data and printing means for printing said print data, said printer driver being configured to control a storage of said form data to said memory means and to control data transmission of said print data and said form data to said printing means, said printer driver comprising:
 first selecting means for selecting at least one of a first form overlay instruction for assigning said print data as a background image and said form data as a foreground and a second form overlay instruction for assigning said print data as a foreground image and said form data as a background; and
 first form-overlay managing means for executing a first form-overlay operation for adding said form data immediately after each page of said print data when said first selecting means selects said first form overlay instruction and said form data in front of each page of said print data when said first selecting means selects said second form overlay instruction, and transmitting said print data added with said form data to said printing means.

18. The printer driver as defined in claim 17, wherein said printing means includes form data registering means for registering form data sent from said printer driver, and said printer driver further comprising:

second form-overlay managing means for performing a second form-overlay operation for sending said form data to said printing means to store said form data in said form data registering means of said printing means, generating a form overlay execution command, adding said form overlay execution command immediately after each page of said print data when said first selecting means selects said first form overlay instruction and said form overlay execution command in front of each page of said print data when said first selecting means selects said second form overlay instruction, and transferring said print data added with said form overlay execution command to said printing means; and second selecting means for selecting at least one of said first and second form-overlay operations.

19. The printer driver as defined in claim 17, wherein said printer driver controls said memory means to store said print data generated by said application as form data, and said second form-overlay managing means of said printer driver neglects a white painting instruction generated by said application, said white painting instruction instructing to paint a background page with a white color before print data is expanded over said background page.

20. The printer driver as defined in claim 18, wherein said print system further comprising data entry means for entering user instructions to select at least one of said first and second selecting means of said printer driver.

21. A method for printer driving in a print system which operates with an operating system and with an application, compatible with said operating system, for generating print data, and which includes a memory for storing form data and a print station for printing said print data, said method comprising the steps of:

a first selecting step for selecting at least one of a first form overlay instruction for assigning said print data as a background image and said form data as a foreground and a second form overlay instruction for assigning said print data as a foreground image and said form data as a background;

a first form-overlay executing step for executing a first form-overlay operation for adding said form data immediately after each page of said print data when said first selecting step selects said first form overlay instruction and said form data in front of each page of said print data when said first selecting step selects said second form overlay instruction; and transmitting said print data added with said form data to said print station.

22. The method as defined in claim 21, wherein said print station includes a form data register which is configured to register form data sent from said printer driver, and said method further comprising the steps of:

a second form-overlay executing step for performing a second form-overlay operation for sending said form data to said print station to store said form data in said form data register of said print station;

generating a form overlay execution command;

adding said form overlay execution command immediately after each page of said print data when said first selecting step selects said first form overlay instruction and said form overlay execution command in front of each page of said print data when said first selecting step selects said second form overlay instruction; and transferring said print data added with said form overlay execution command to said print station.

23. The method as defined in claim 22, further comprising a second selecting step for selecting at least one of said first and second form-overlay executing steps.

24. The method as defined in claim 22, wherein said storing step stores said print data generated by said application as form data, and said second form-overlay executing step neglects a white painting instruction generated by said application, said white painting instruction instructing to paint a background page with a white color before print data is expanded over said background page.

25. The method as defined in claim 23, further comprising an entering step for entering user instructions relative to said selection by said first and second selecting steps.

26. A computer readable medium storing computer instructions for performing the steps recited in anyone of claims 21–25.

\* \* \* \* \*